(12) United States Patent
Hannu et al.

(10) Patent No.: US 6,999,429 B1
(45) Date of Patent: Feb. 14, 2006

(54) ACCESS TECHNOLOGY INTEGRATED HEADER COMPRESSION

(75) Inventors: Hans Hannu, Lulea (SE); Krister Svanbro, Lulea (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1093 days.

(21) Appl. No.: 09/652,461

(22) Filed: Aug. 31, 2000

Related U.S. Application Data

(60) Provisional application No. 60/186,700, filed on Mar. 3, 2000.

(51) Int. Cl.
*H04L 12/56* (2006.01)

(52) U.S. Cl. ............... 370/328; 370/389; 370/392; 370/393; 370/394; 370/474; 370/475; 709/247

(58) Field of Classification Search ........... 370/349, 370/350, 394, 395.52, 507, 510, 524; 704/500, 704/501

See application file for complete search history.

(56) References Cited

U.S. PATENT DOCUMENTS

| | | | |
|---|---|---|---|
| 5,293,379 A | | 3/1994 | Carr .................... 370/94.1 |
| 5,717,689 A | * | 2/1998 | Ayanoglu ............... 370/349 |
| 5,742,773 A | * | 4/1998 | Blomfield-Brown et al. .................... 709/228 |
| 5,987,022 A | * | 11/1999 | Geiger et al. ........... 370/349 |
| 6,608,841 B1 | * | 8/2003 | Koodli ................. 370/474 |
| 6,751,209 B1 | * | 6/2004 | Hamiti et al. .......... 370/349 |

FOREIGN PATENT DOCUMENTS

WO     WO 00/49748     8/2000

OTHER PUBLICATIONS

Carsten Bormann: "Robust Header Compression (ROHC)" Internet Draft; Jun. 29, 2000; pp. 1-122.
Perkins, et al.; "Effects of Interleaving on RTP Header Compression" *Infocom 2000. Nineteenth Annual Joint Conference of the IEEE Computer and Communication Societies.* Proceedings IEEE; Mar. 26, 2000; vol. 1; pp 111-117.
Svanbro, et al.: "Wireless Real-Time IP Services Enabled by Header Compression"; *Vehicular Technology Conference Proceedings*, May 15, 2000, vol. 2; pp. 1150-1154.
Postel, J. "User Datagram Protocol". RFC: 768. Aug. 28, 1980. <http://www.cis.ohio-state.edu/htbin/rfc/rfc768.html>. pp. 1-3.
Postel, J. "Internet Protocol: Darpa Internet Program, Protocol Specification". RFC: 791. Sep. 1981. <http://www.faqs.org/rfcs/rfc791.html>. pp. 1-119.
Schulzrinne, H. "RTP: A Transport Protocol for Real-Time Applications". RFC: 1889. Jan. 1996. <http://www.faqs.org/rfcs/rfc1889.html>. pp. 1-69.

\* cited by examiner

*Primary Examiner*—Alpus H. Hsu
*Assistant Examiner*—Justin M. Philpott

(57) ABSTRACT

An access technology integrated header compression method or apparatus sends an IP-based speech data packet over a radio interface without sending information related to changes in the IP identification, RTP sequence number, or RTP time stamp. The omission of information related to changes in these fields from the header reduces the bandwidth consumed by the header. These fields are then reconstructed at the receiver side of the radio interface.

7 Claims, 9 Drawing Sheets

ACCESS TECHNOLOGY INTEGRATED HEADER COMPRESSION

CROSS-REFERENCE TO RELATED APPLICATIONS

This Application for Patent claims the benefit of priority from, and hereby incorporates by reference the entire disclosure of, U.S. Provisional Application for Patent Ser. No. 60/186,700, filed Mar. 3, 2000 now abandoned.

FIELD OF THE INVENTION

The invention relates generally to packet communications and, more particularly, to header compression in packet communications.

BACKGROUND OF THE INVENTION

The tremendous success of the Internet has made it desirable to expand the Internet Protocol (IP) to a wide variety of applications including voice and speech communication. The objective is, of course, to use the Internet as a link for transporting voice and speech data. Speech data has been transported across the Internet using IP-based transport layer protocols such as the User Datagram Protocol (UDP) and the Real-time Transport Protocol (RTP). In a typical application, a computer running telephony software converts speech into digital data which is then assembled into IP-based data packets that are suitable for transfer across the Internet. Additional information regarding the UDP and RTP protocols may be found in the following publications which are incorporated herein by reference: Jon Postel, *User Datagram Protocol*, DARPA RFC 786, August 1980; Henning Schulzrinne et al., *RRT:A Transport Protocol For Real-time Applications*, IETF RF 1889, IETF Audio/video Transport Working Group, January 1996.

A typical IP-based speech data packet 10 is shown in FIG. 1. The packet 10 is one of a plurality of related packets that form a stream of packets representing a portion of, for example, a voice conversation. The packet 10 is made of a header portion 12 and a payload portion 14. The header 12 may comprise a number of header components including static information 16 such as the source and destination address fields (not shown), and dynamic information 18 such as the IP identification, RTP sequence number, and RTP time stamp fields. For ordinary speech data transported over IP-based protocols, the header 12 may represent up to 70% of the data packet 10, leaving little capacity for the payload 14. This inefficient use of bandwidth would be much too expensive over a cellular link for IP-based transportation to become a viable alternative to circuit switched speech services. Therefore, some compression or reduction of the header 12 is generally required.

The term header compression refers to the art of transparently minimizing the necessary bandwidth for information carried in packet headers on a per hop basis over point-to-point links. The headers are compressed or otherwise reduced at the transmitting side and then reconstructed at the receiving side. Recall that headers generally comprise both static information and dynamic information, i.e., information that changes from one packet to the next. Header compression is usually realized by sending the static information initially. Then, dynamic information is sent by transmitting only the difference, or delta, from the previous header.

One method of implementing header compression is by using a compression technique called Robust Checksum-based Header Compression (ROCCO). This method uses a CRC to verify the correctness of reconstructed headers at the receiving side. In addition to the CRC, the compressed headers may also contain a predefined code field which is used to indicate how the dynamic information fields have changed from the previous packet to the current packet. As mentioned previously, the dynamic information fields include the IP identification, the RTP sequence number, and the RTP time stamp.

However, as long as bandwidth continues to be considered a valuable commodity, there will continue to be a need to conserve more bandwidth, especially over cellular links. Therefore, it is desirable to be able to further reduce the amount of header information transmitted, even where such information has already been compressed by an algorithm such as ROCCO.

The present invention advantageously provides techniques for conserving additional bandwidth by omitting, from the compressed header, information related to the changes in the IP identification, RTP sequence number, and RTP time stamp. Instead, reconstruction of the header at the receiving or decompressor side is performed based on information about these fields as retained in the access technology.

SUMMARY OF THE INVENTION

The present invention is directed to an access technology integrated header compression method or apparatus for sending an IP-based speech data packet over a radio interface without sending information related to changes in the IP identification, RTP sequence number, or RTP time stamp. The omission of information related to changes in these fields reduces the bandwidth consumed by the header. These fields are then reconstructed at the receiver side of the radio interface.

In one aspect, the invention is directed to a method of sending an IP-based data packet across a radio link, the data packet having a packet header including an IP identification header field, sequence number header field, and time stamp header field. The method comprises the steps of compressing the packet header, adjusting an IP identification within the IP identification header field of the packet header to conform to a stream-sequential identification format, synchronizing the data packet to a radio frame based on a time stamp within the time stamp header field of the packet header and a timing of the radio frame, and transmitting the data packet with the radio frame over the radio link.

In another aspect, the invention is directed to a telecommunication system for sending an IP-based data packet across a radio link, the data packet having a packet header including an IP identification header field, sequence number header field, and time stamp header field. The system comprises a compressor for compressing the packet header, an IP identification processor for adjusting an IP identification within the IP identification header filed to conform to a stream-sequential format, a synchronizer for synchronizing the data packet to a radio frame based on a time stamp within the time stamp header field and a timing of the radio frame, and a transmitter for transmitting the data packet with the radio frame over the radio link.

A more complete appreciation of the present invention and the scope thereof can be obtained from the accompanying drawings (which are briefly summarized below), the following detailed description of the presently-preferred embodiments of the invention, and the appended claims.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As mentioned previously, most conventional header compression algorithms send only the changes, or deltas, in the header fields and not the actual fields themselves. This means that only the least significant bit or bits are sent as they are the ones most likely to be changing. The present invention improves upon this process by omitting to send even the information related to the changes. In an exemplary embodiment, the present invention omits sending information specifically related to changes in the IP identification, RTP sequence number, and RTP time stamp.

In accordance with the exemplary embodiment, static information is sent at the beginning of a packet stream, preferably before the first packet in the stream is sent. The static information may be sent on a dedicated channel or a random access channel, for example, as long as the information is made available at the receiver before the first packet arrives. The static information may include the source and destination addresses of the packets in the stream and generally may be applied to all the packets in the stream. The packets are then sent in sequential order minus the changes, or deltas, in the IP identification, RTP sequence number, or RTP time stamp.

The IP identifications of the packets are preferably stream-sequential, that is, they follow a predictable sequence within the stream. If they are not, then they should be adjusted to conform to a stream-sequential format, as will be explained herein. As for the RTP sequence number and RTP time stamp, these should already be in a sequence format which is predictable and should not need adjusting.

Figure 1:
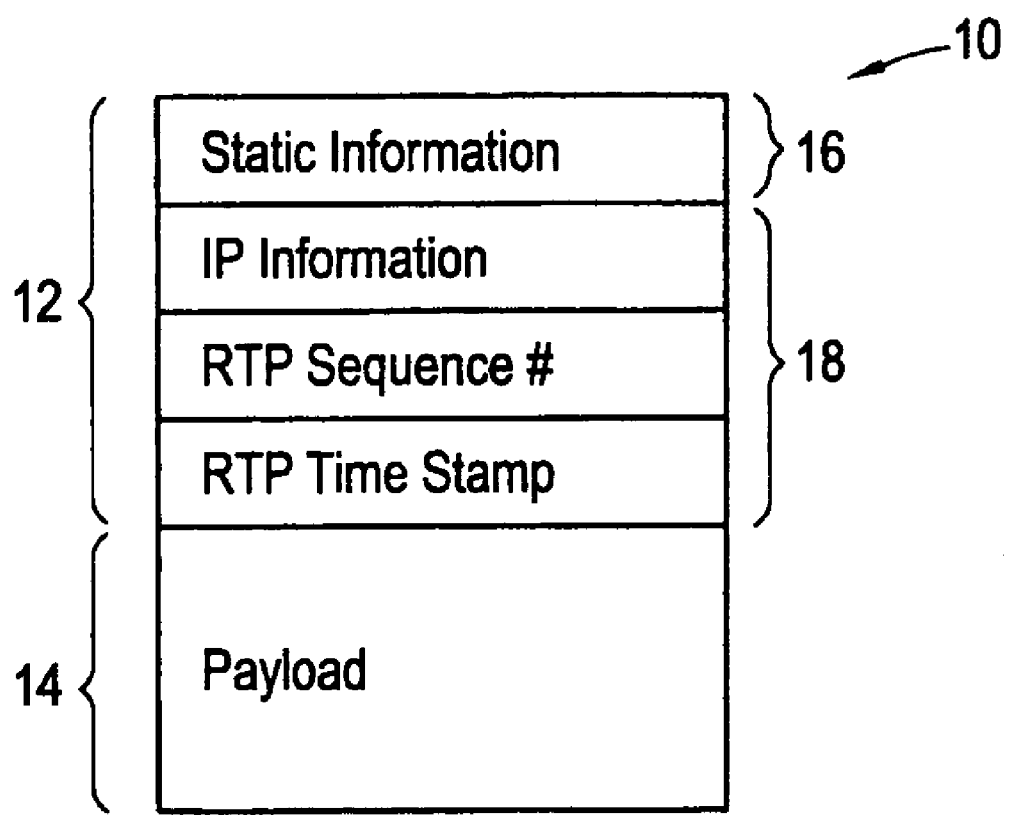
FIG. 1 illustrates a typical IP-based speech data packet.
Figure 2:
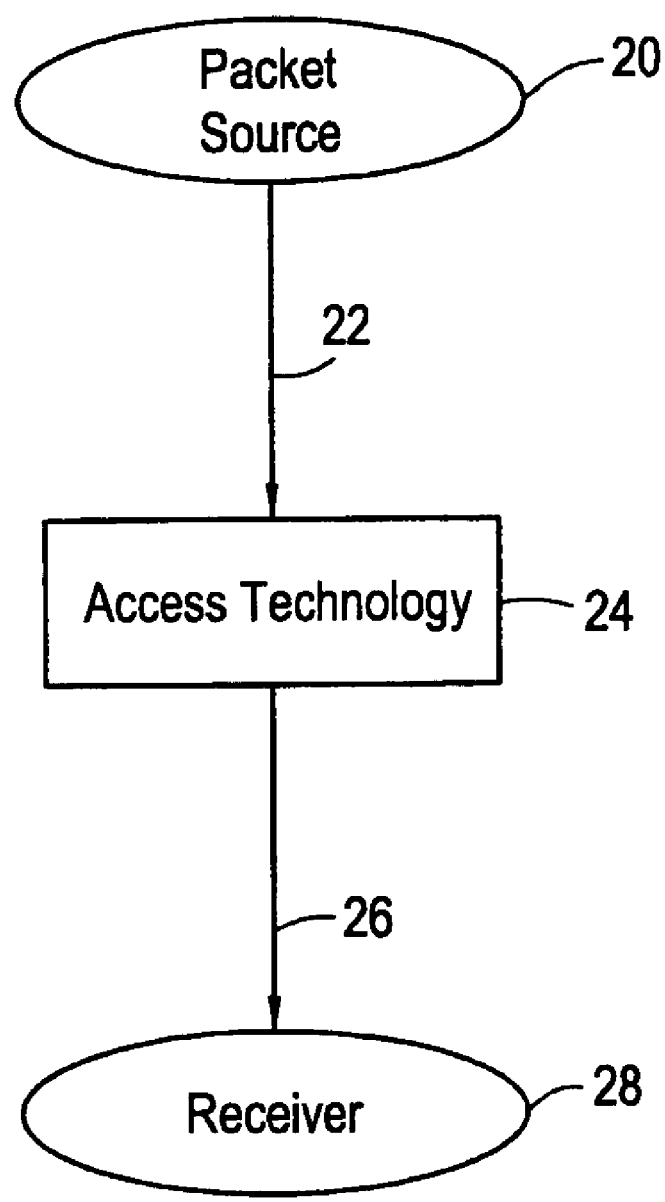
FIG. 2 illustrates the flow of the speech data packet across a communications link via an access technology.

Referring now to FIG. 2, a pertinent portion of an exemplary packet-switched communication network is shown. As can be seen, a packet source 20 provides data packets across a link 22 to an access technology 24. The packet source 20 produces a stream of data packets that follow IP-based protocols such as the UDP and RTP protocols. The link 22 may be any link which is capable of transporting the data packets from the packet source 20 to the access technology 24 such as PSTN or ISDN lines.

The access technology 24, in general, is a layer of communications protocols that provides access to a receiver 28 over a radio interface 26. Examples of the access technology 24 include, but are not limited to the Global System for Mobile Communications (GSM), Code Division Multiple Access (CDMA), Wideband Code Division Multiple Access (WCDMA), Advanced Mobile Phone System (AMPS), Digital Advanced Mobile Phone System (D-AMPS), Personal Digital Cellular (PDC, Digital European Cordless Telephone (DECT), Cellular Digital Packet Data (CDPD), etc. The access technology 24 provides conventional compression for the headers of the data packets received from the packet source 20 and transmits the packets (with the compressed headers) across a link 26 to a receiver 28. This compression may be done, for example, in accordance with the ROCCO compression algorithm, or with any other header compression algorithm. The link 26 may be any radio interface between the access technology 24 and the receiver 28 such as a cellular link. Finally, the receiver 28 receives the packets from the access technology 24 and reconstructs the headers, and then forwards the packets including reconstructed headers to their next destination.

Figure 3:
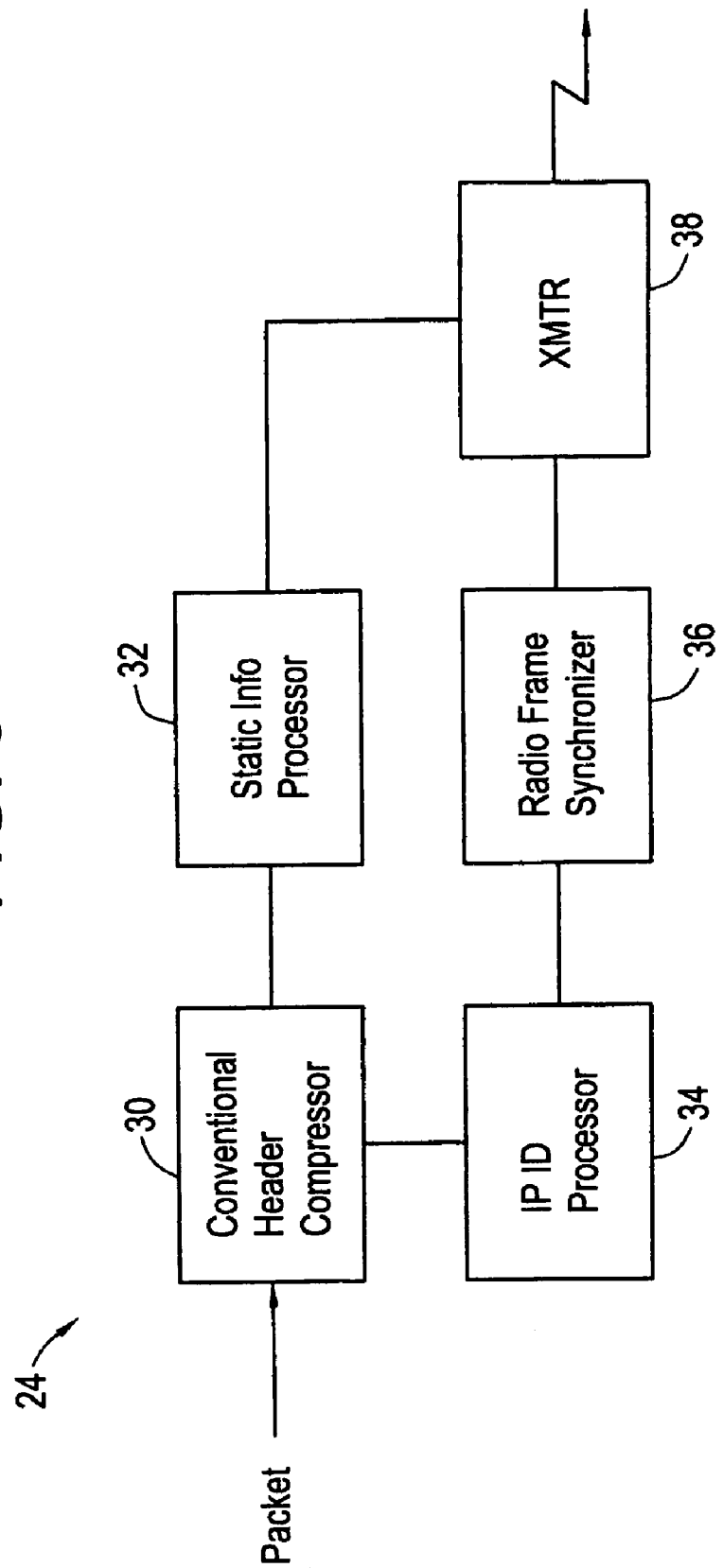
FIG. 3 illustrates an exemplary embodiment of the header compressor incorporated into the access technology shown in FIG. 2.

Included within the access technology 24 are a number of functional components for compressing the data packet headers. In one embodiment, illustrated in more detail in FIG. 3, the access technology 24 includes a conventional header compressor 30 which compresses the received packet headers. Once the packet headers have been processed by the compressor 30, a static information processor 32 checks to see if the static information for the packets in this particular stream has been previously transmitted to the receiver 28. If it has not, the static information processor 32 causes the static information to be sent to the receiver 28.

The access technology 24 also includes an IP identification processor 34 which determines what type of IP identification is contained in the packet headers. In general, there may be three types of IP identification formats: stream-sequential, random, and host-sequential. In stream-sequential formatting, the IP identification is substantially related to the RTP sequence number and may be reliably calculated based on the RTP sequence number. The host-sequential or random formats, on the other hand, are not reliably predictable. Therefore, if the IP identification follows either the host-sequential or random formatting, it must be adjusted to comply with the stream-sequential format.

Adjusting may be accomplished by means of a predefined look-up table used to map the IP identification from the host-sequential or random format to the stream-sequential format. Mapping of IP identifications has been previously disclosed in a related application entitled "Manipulating Header Fields For Improved Performance in Packet Communications", application Ser. No. 09/406,950 filed on Sep. 28, 1999/

Finally, a radio frame synchronizer 36 synchronizes the data packets with the radio frames. The radio frame synchronizer 36 also functions as a type of buffer for the packets to temporarily store the packets. The synchronized packets are then sent via a transmitter 38 over the link 26 to the receiver 28.

Figure 4:
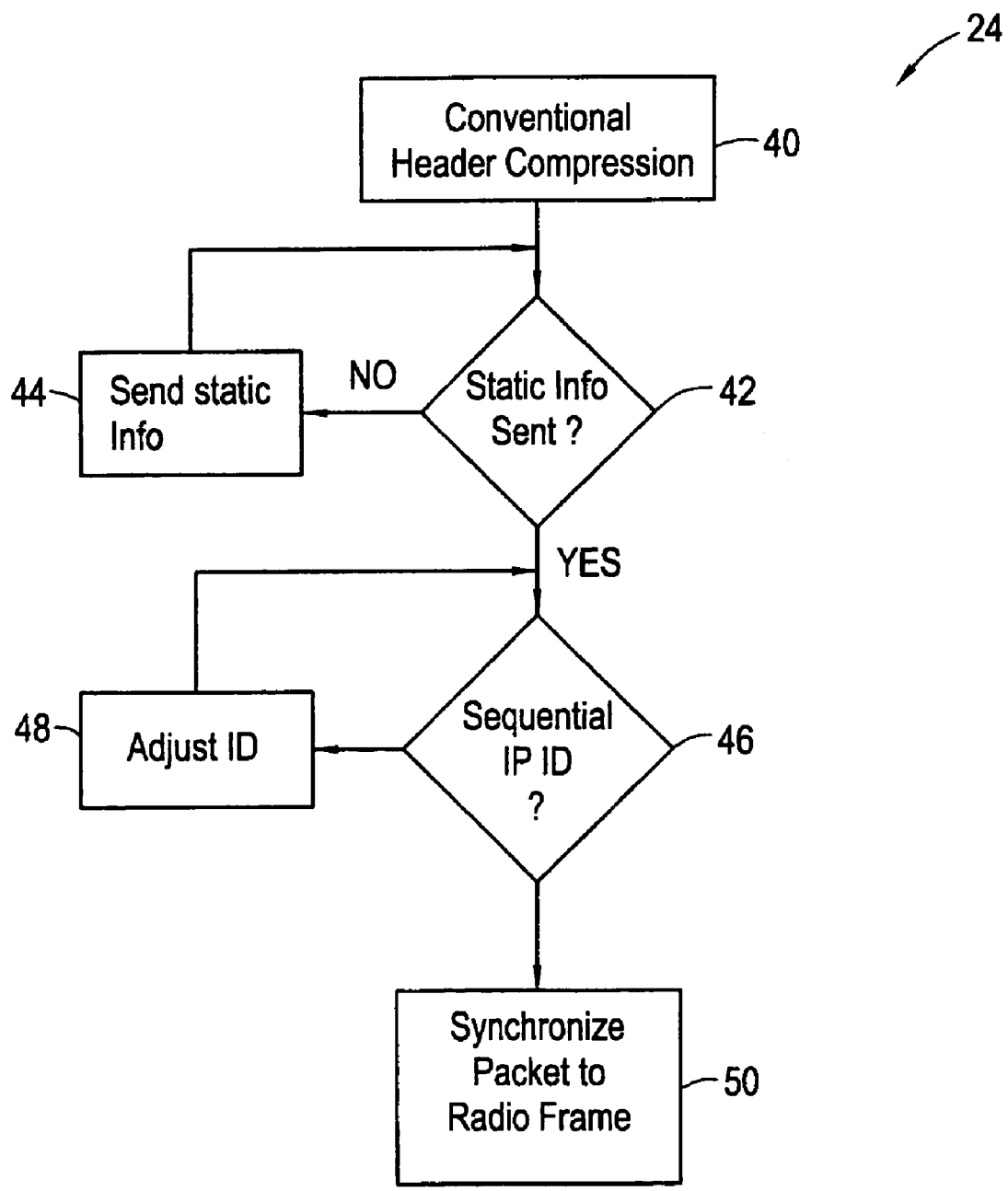
FIG. 4 illustrates the general flow of the exemplary embodiment shown in FIG. 2.

FIG. 4 shows the general flow of a data packet through the access technology 24. At step 40, a conventional header compression algorithm (such as ROCCO) is used to compress the header in a conventional manner. At steps 42 and 44, static information is sent if it has not been previously sent for this particular stream. At step 46, the header IP identification is examined to determine whether it follows a stream-sequential format, i.e., is predictable. If the IP identification is not stream-sequential, then it is adjusted at step 48 to conform with the stream-sequential format. Once the IP identification has been adjusted, the packet is synchronized to the radio frame and sent over the radio interface 26 at step 50.

Figure 5:
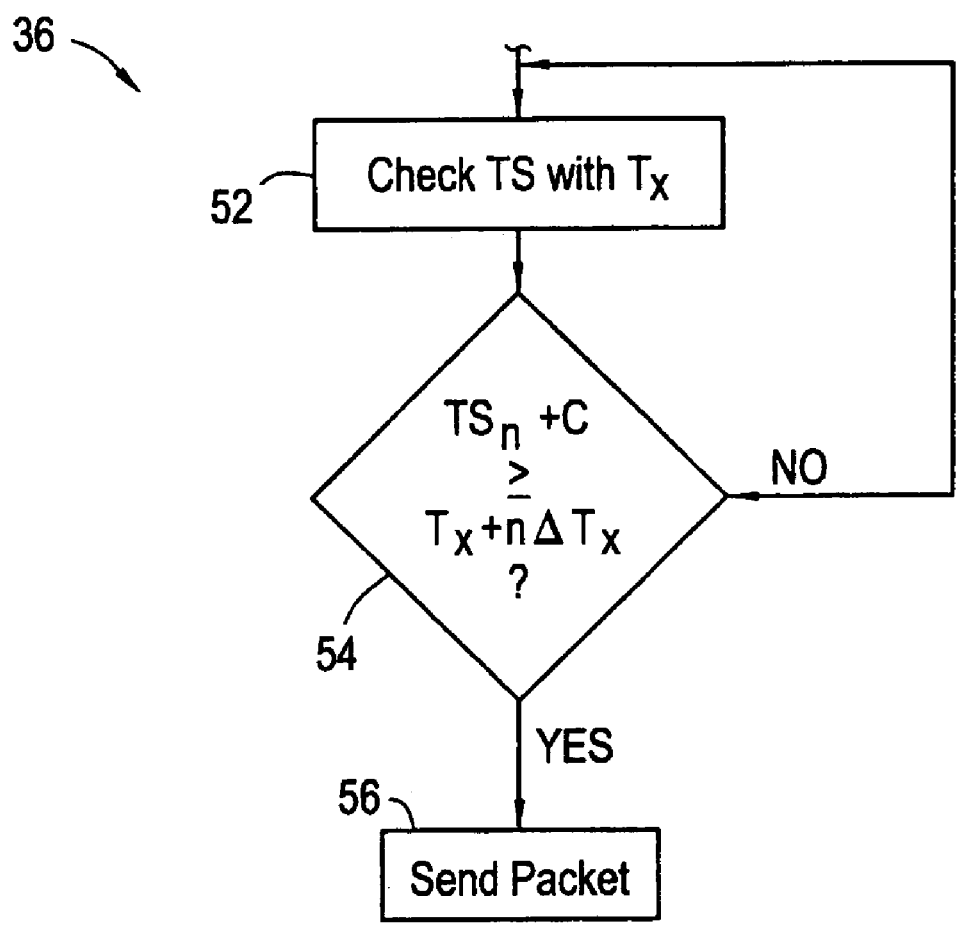
FIG. 5 illustrates a packet synchronization flow of the embodiment shown in FIG. 2.

FIG. 5 further illustrates the function of the synchronizer 36. First, the RTP time stamp TS of the packet header is compared with the transmission time $T_x$ of the radio frame at step 52. As mentioned previously, each packet contains an RTP time stamp TS. The RTP time stamp TS indicates the point in time when the packet was created relative to the previous packet. This information is used to synchronize the data packet with the outgoing radio frame as follows. Consider a packet $P_{n-1}$ and a subsequent packet $P_n$. The packet $P_{n-1}$, in this example, has an RTP time stamp TS value of 20 representing 20 RTP time stamp units (each unit being equivalent to, say 1 mS), whereas the packet $P_n$ has a TS value of 40. The $\Delta$TS in this case is 20. Now consider a radio frame sent at time $T_x$ and a subsequent radio frame sent at time $T_x + \Delta T_x$. The synchronizer synchronizes the data packets such that $\Delta$TS is aligned with $\Delta T_x$. Thus, if $TS_n$ is greater than or equal to $T_x$ plus $n\Delta T_x$, the packet $P_{n-1}$ is sent with the radio frame at time $T_x$ while the packet $P_n$ is sent with the second radio frame at time $T_x + \Delta T_x$. In some embodiments, a predefined offset C may be added to $TS_n$ such as is shown at step 54. The packet is sent with the radio frame at step 56.

Figure 6:
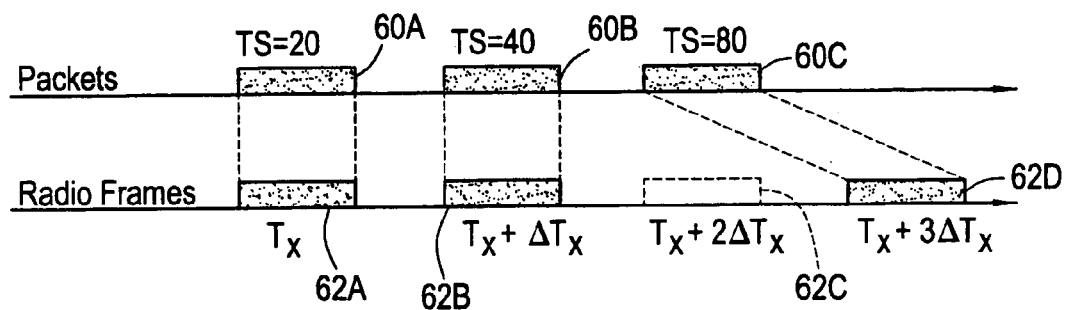
FIG. 6 is a graphical representation of the packet synchronization flow shown in FIG. 5.

In the case where there is an extended difference in RTP time stamp values between packets, as illustrated in FIG. 6, the synchronizer 36 may delay the packet by an appropriate multiplier of $\Delta T_x$. As shown in FIG. 6, a packet 60A corresponds to a radio frame 62A, packet 60B corresponds to radio frame 62B, but packet 60C is extended or delayed to radio frame 62D, skipping radio frame 62C.

Figure 7:
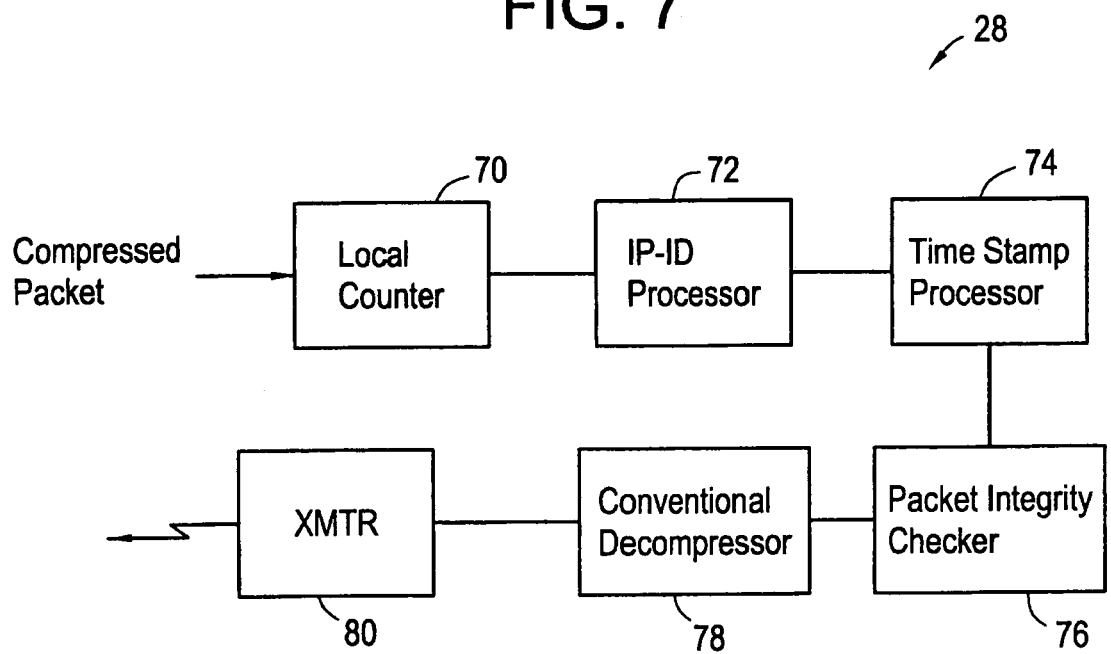
FIG. 7 illustrates an exemplary embodiment of the header decompressor at the receiver side shown in FIG. 2.

Referring now to FIG. 7, the receiver 28 also contains a number of functional components. A local counter 70 assigns an RTP sequence number to each packet received at the receiver 28 based on the order each packet was received. The local counter 70 is preferably ether reset or preset according to the sequence number of the initial packet to be received. For example, this information may be communicated initially as static information. The local counter 70 is then incremented by one with each packet received such that each packet has a different, higher RTP sequence number than the previous packet.

An IP identification processor 72 reconstructs the IP identification based on the RTP sequence number assigned by the local counter 70. For example, if the IP identification is based on a multiple of the RTP sequence number, the IP identification processor 72 may be able to obtain the IP identification by multiplying the RTP sequence number by the appropriate multiplier.

An RTP time stamp processor 74 reconstructs the RTP time stamp value of the packet based on the transmission time of the radio frame which carried that data packet. For example, the initial received packet may have a TS value of, say, 20. The next packet in the next radio frame will have a TS of 40, and so on. Like the RTP sequence number, the initial transmission time information may also be communicated initially with the static information.

A packet integrity checker 76 checks the header to make sure it has not been damaged in some way during the transmission to the receiver 28. If the header has been damaged, it is discarded at this point. A conventional decompressor 78 reconstructs the various header fields and the data packets along with the reconstructed headers is sent to the next destination by a transmitter 80.

Figure 8:
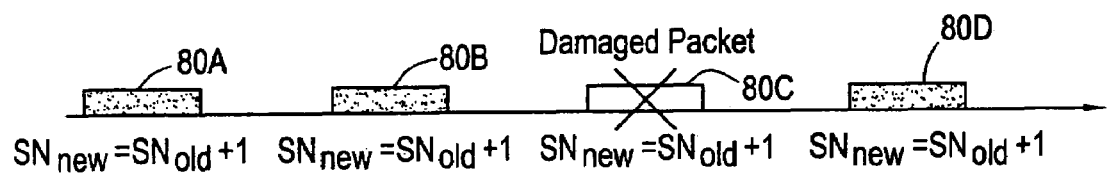
FIG. 8 is a graphical representation of the RTP sequence number reconstruction.

Referring now to FIG. 8, a graphical depiction of the sequencing of the packets as they are received is shown. As can be seen, each new packet is assigned an RTP sequence number by the local counter, with each new packet receiving an RTP sequence number (SN) that is higher by 1 than the previous packet in this embodiment. Packets 80A and 80B are so received. Damaged packets, e.g., packet 80C, even though they are discarded, are still counted by the local counter 70 in order to increase the RTP sequence number. Then packet 80D, which is received after the damaged packet 80C, is assigned an RTP sequence number (SN) that is higher by 1 than the damaged packet 80C.

Figure 9:
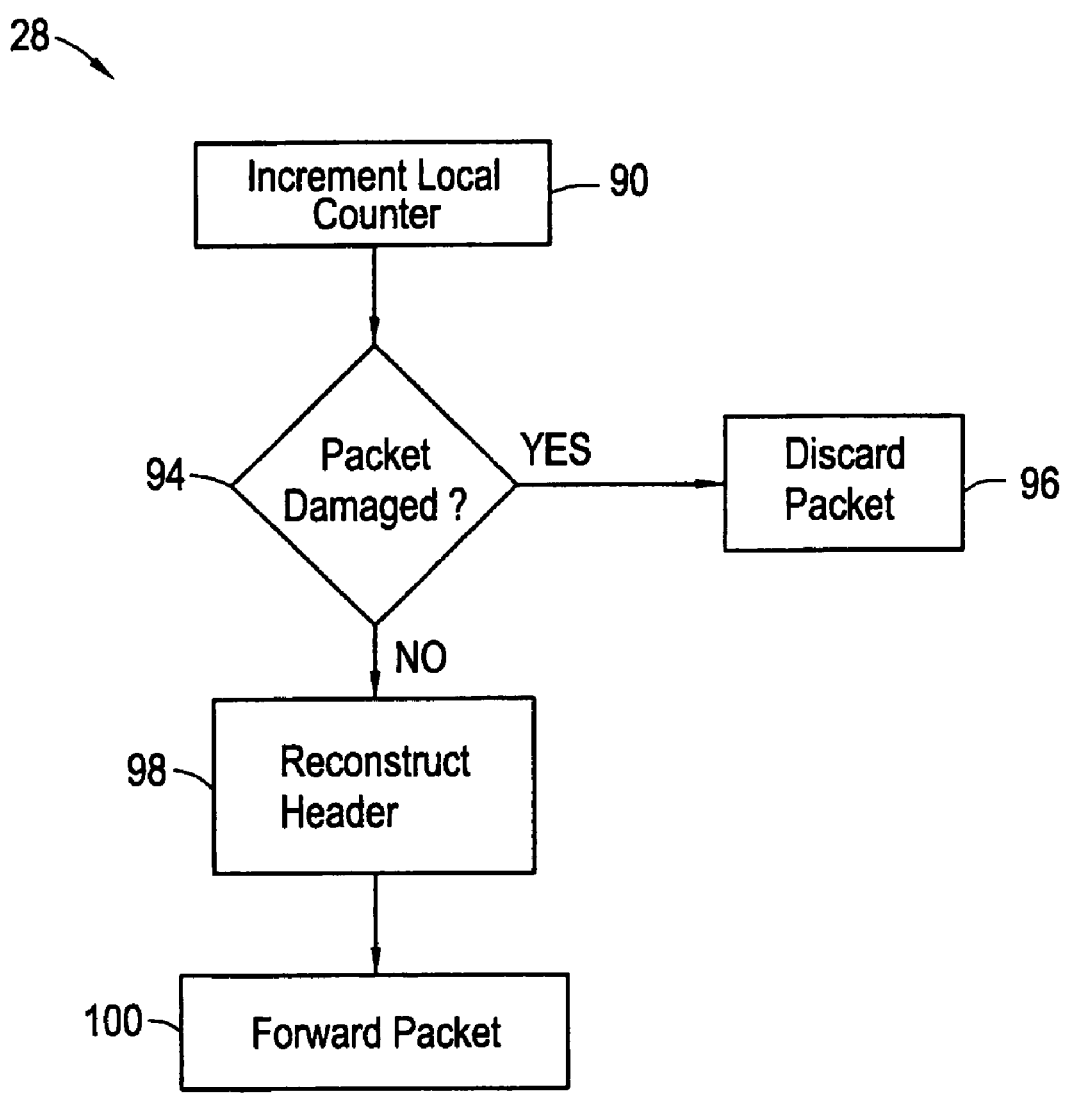
FIG. 9 illustrates the general flow of the exemplary embodiment shown in FIG. 7.

Referring now to FIG. 9, the general flow at the receiver is shown. The local counter is incremented at step 90. The packet is checked for damage at step 94, and discarded at step 96 if damage is found. If no damage is found, then the RTP sequence number, IP identification, and RTP time stamp are reconstructed at step 98, and the reconstructed header is forwarded at step 100 to the next destination.

Thus, by using the method described herein, the important fields of the packet header, namely the IP identification, RTP sequence number, and RTP time stamp can be obtained at the receiver side without having to transmit any header related information at the access technology side (except for any static information as previously mentioned).

It should be noted that for the method of the present invention to succeed, there can be no reordering of packets and no lost packets at the source without some indication to the access technology. If a packet is reordered or lost, or both, before the compression at the access technology, appropriate action must be taken in order to rectify the sequential misnumbering. Actions which may be taken include sending additional information to the compressor of the access technology to inform it of the packet reordering or loss and adjusting the packet flow at the decompressor of the receiver.

Although the invention has been described with reference to specific embodiments, various modifications and alternatives exist which were not described, but which are within the scope and spirit of the invention. Accordingly, the invention should be limited by only the following claims.

What is claimed is:

1. A method for sending an Internet Protocol (IP)-based data packet across a radio link, said method comprising the steps of:
   compressing a packet header in the IP-based data packet, where said compressed packet header contains information related to changed values within an IP identification header field, a Real-Time-Transport Protocol (RTP) sequence number field and a RTP time stamp field when compared to values in a packet header associated with a previous IP-based data packet;
   compressing said compressed packet header again such that said further compressed packet header does not contain any information at all related to the IP identification header field, the RTP sequence number field and the RTP time stamp field, wherein said second compressing step further includes:
  adjusting an IP identification of said IP identification header field to conform to a stream-sequential identification format if said IP identification conforms to a random format or a host-sequential format; and
  synchronizing said IP-based data packet to a radio frame based on a time stamp within said RTP time stamp header field and a timing of said radio frame; and
transmitting said IP-based data packet that has said further compressed packet header across the radio link.

2. The method of claim 1, wherein said first step of compressing is done in accordance with a Robust Checksum-Based Header Compression (ROCCO) technique.

3. The method of claim 1, further comprising the steps of:
receiving said transmitted IP-based data packet; and
decompressing said received IP-based data packet to reconstruct the packet header by adding values in the IP identification header field, the RTP sequence number field and the RTP time stamp field.

4. The method of claim 3, wherein said step of decompressing further includes:
  assigning a sequence number to said RTP sequence number header field;
  reconstructing an IP identification of said IP identification header field using said assigned sequence number; and
  reconstruction a time stamp of said time stamp header field using a timing of said radio frame.

5. A transmitter, comprising:
a first compressor for compressing a packet header in an Internet Protocol (IP)-based data packet, where said compressed packet header contains information related to changed values within an IP identification header field, a Real-Time-Transport Protocol (RTP) sequence number field and a RTP time stamp field when compared to values in a packet header associated with a previous IP-based data packet;
a second compressor for compressing said compressed packet header again such that said further compressed packet header does not contain any information at all related to the IP identification header field, the RTP sequence number field and the RTP time stamp field, wherein said second compressor includes:
  an IP identification processor for adjusting an IP identification of said IP identification header field to conform to a stream-sequential identification format if said IP identification conforms to a random format or a host-sequential format; and
  a radio frame synchronizer for synchronizing said IP-data packet to a radio frame based on a time stamp within said RTP time stamp header field and a timing of said radio frame; and
a transmitter for transmitting said IP-based data packet that has said further compressed packet header across the radio link.

6. The transmitter of claim 5, wherein said first compressor uses a Robust Checksum-Based Header Compression (ROCCO) technique to compress the packet header in the IP-based data packet.

7. A receiver, comprising:
a receiving unit for receiving an Internet Protocol (IP)-based data packet that has a compressed packet header which does not contain any information at all related to an IP identification header field, a Real-Time-Transport Protocol (RTP) sequence number field and a RTP time stamp field; and
a decompression unit for reconstructing the compressed packet header by adding values in the IP identification header field, the RTP sequence number field and the RTP time stamp field, wherein said decompressing unit further includes:
  a local counter for assigning a sequence number within said RTP sequence number header field;
  an IP identification processor for reconstructing an IP identification within said IP identification header field using said assigned sequence number; and
  an RTP time stamp processor for reconstructing a time stamp within said RTP time stamp field using a timing of a radio frame in which the IP-based data packet was received.

* * * * *